United States Patent [19]

Frederick

[11] Patent Number: 5,157,820

[45] Date of Patent: Oct. 27, 1992

[54] CAPACITOR MANUFACTURING PROCESS

[75] Inventor: W. Richard Frederick, Mundelein, Ill.

[73] Assignee: Integrated Power Components, Inc., Carol Stream, Ill.

[21] Appl. No.: 626,263

[22] Filed: Dec. 12, 1990

[51] Int. Cl.⁵ .............................................. H01G 13/00
[52] U.S. Cl. ................ 29/25.42; 264/271.18; 427/81
[58] Field of Search ............... 29/25.42; 264/272.18; 427/79, 81

[56] References Cited

U.S. PATENT DOCUMENTS

| | | | |
|---|---|---|---|
| 3,364,401 | 1/1968 | Rayburn | 29/25.42 X |
| 3,670,378 | 6/1972 | Behn et al. | 29/25.42 |
| 4,633,368 | 12/1986 | Frederick | 29/25.42 X |
| 4,633,551 | 1/1987 | Bernard | 29/25.42 |
| 4,637,106 | 1/1987 | Bernard | 29/25.42 |
| 4,719,675 | 1/1988 | Savoia | 29/25.42 |

*Primary Examiner*—Carl E. Hall
*Attorney, Agent, or Firm*—Arnold, White & Durkee

[57] ABSTRACT

A method of fabricating an electrical capacitor from a wound laminate of conductive and non-conductive materials comprises the steps of enclosing the wound laminate in a sealed chamber; drawing a vacuum on the chamber to evacuate any voids in the wound laminate, and then filling the chamber with a pressurized impregnating gas to fill the evacuated voids in the wound laminate; heating the laminate to a curing temperature; applying schoopage metal to opposite ends of the cured laminate; attaching a pair of electrical leads to the schoopage metal on opposite ends of the cured laminate, and encapsulating the cured laminate in a molded polymer.

19 Claims, 10 Drawing Sheets

CAPACITOR MANUFACTURING PROCESS

FIELD OF THE INVENTION

The present invention relates generally to the fabrication of wound laminated capacitors and, more particularly, to capacitor processes which are suitable for the manufacture of multiple-function capacitors.

OBJECTS AND SUMMARY OF THE INVENTION

It is a primary object of the present invention to provide an improved method of rapidly fabricating wound laminated capacitors, so that the production rate is several times as great as that of previous processes used to manufacture such capacitors.

It is another important object of this invention to provide an improved capacitor-fabricating method which reduces both the size and the cost of the capacitors, and also reduces the amount of capital equipment required. In this connection, a related object of the invention is to provide such an improved method which permits multiple processing steps to be carried out on the same equipment, such as applying a masking film on the same winding machine that is used to form the main body portion of the wound laminate.

A further object of this invention is to provide an improved capacitor-fabricating method which produces capacitors of uniform quality with a high degree of reliability.

It is yet another object of this invention to provide an improved capacitor-manufacturing method which reduces the amount of material consumed in the fabrication of the capacitors.

A still further object of this invention is to provide an improved capacitor-manufacturing method which improves the positioning of the leads attached to the capacitors, which in turn facilitates use of the capacitors in automated processes.

It is still another object of this invention to provide an improved capacitor manufacturing method which is readily adaptable to the fabrication of different models of capacitors, and which can be used to make either X-type capacitors, or Y-type capacitors, or X-Y (delta) capacitors.

In accordance with the present invention, the foregoing objectives are realized by providing a method of fabricating an electrical capacitor from a wound laminate of conductive and nonconductive materials, the method comprising the steps of enclosing the wound laminate in a sealed chamber, drawing a vacuum on the chamber to evacuate any voids in the wound laminate and then filling the chamber with a pressurized impregnating gas to fill the evacuated voids, heating the laminate to a curing temperature, applying schoopage metal to opposite ends of the cured laminate, attaching a pair of electrical leads to the schoopage metal on opposite ends of the cured laminate, and encapsulating the cured laminate in a molded polymer.

BRIEF DESCRIPTION OF THE DRAWING

FIG. 6b is a sectional view of the same device shown in FIG. 6a, taken orthogonal to the section of FIG. 6a.

DETAILED DESCRIPTION OF THE PREFERRED EMBODIMENTS

While the invention is susceptible to various modifications and alternative forms, a specific embodiment thereof has been shown by way of example in the drawings and will be described in detail therein. It should be understood, however, that it is not intended to limit the invention to the particular forms disclosed. On the contrary, the intention is to cover all modifications, equivalents and alternatives falling within the spirit and scope of the invention as defined by the appended claims.

Figure 1:
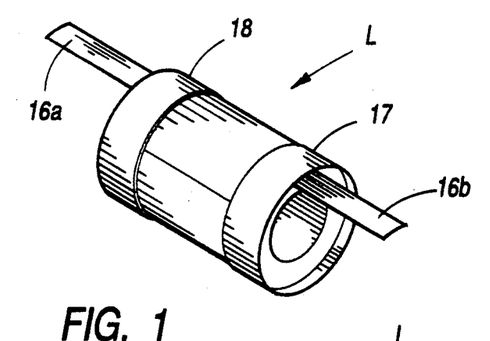
FIG. 1 is a perspective view of a wound laminate for use in the process of the present invention.
Figure 2:
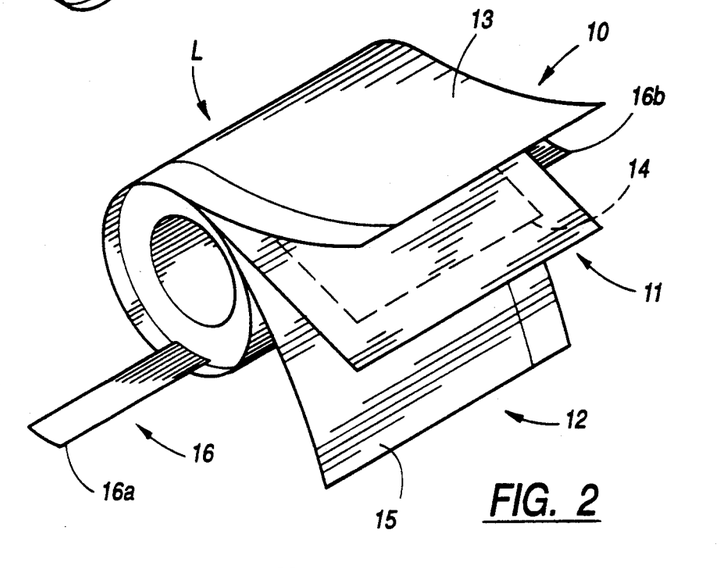
FIG. 2 is a perspective view of the wound laminate of FIG. 1 with the end portions of the laminate peeled apart to show the various layers.

The preferred embodiment of this invention will be described as a process for fabricating a multiple-function capacitor of the type described in the applicant's U.S. Pat. No. 4,633,368, issued on Dec. 30, 1986, for a "Multiple Function Integrated Capacitor." It will be understood, however, that the process described herein are also applicable to the manufacture of simpler capacitors such as X-type and Y-type capacitors. The wound laminate L illustrated in FIG. 1 can be formed in winding equipment of the type described and illustrated in the aforementioned U.S. Pat. No. 4,633,368. As illustrated in FIG. 2 the wound laminate L is formed from a winding of three different layers 10, 11 and 12. Each of the three layers includes a base sheet of insulating material such as paper or plastic which is metallized over a portion of its surface. The outermost layer 10 has a metallized area 13 covering all but a narrow band of the insulating base sheet along its left-hand edge, as viewed in FIG. 2. This metallized area 13 forms a first electrode for the multiple-function capacitor. The middle layer 11 comprises a narrow strip of metal foil sandwiched between two wider strips of insulating film so that there are insulating bands extending along both edges, as well as the ends, of the metal foil. This metal foil 14 forms a second electrode for the multi-function capacitor. Finally, the innermost layer 12 has a metallized area 15 extending over the entire surface area of the insulating base sheet except for a narrow band along its right-hand edge. This metallized area 15 forms the third electrode for the multi-function capacitor.

The two electrodes 13 and 15 form the plates of a first or "X" capacitor, while the electrode pairs 13, 14 and 14, 15 form the respective plates of second and third "Y" capacitors. This multi-function capacitor is particularly useful in forming a "delta" capacitor, as described in the aforementioned U.S. Pat. No. 4,633,368.

As described in the aforementioned U.S. Pat. No. 4,633,368, schoopage metal is applied to opposite ends of the wound laminate L to make electrical contact with the two electrodes 13 and 15. Electrical contact with the intermediate electrode 14 is effected by a conductive strip 16 disposed between layers 11 and 12. The strip 16 has an exposed central region in contact with the electrode 14, and then is covered with an insulating material along the portions of the strip which extend through the end faces of the wound laminate, so as to prevent electrical contact between this strip and the two electrodes 13 and 15.

To facilitate the application of the schoopage metal, strips 17 and 18 (FIG. 1) of masking film are wound around the edge portions of the laminate L and projecting beyond opposite ends of the laminate. As will be described in more detail below, the films 17 and 18 serve to prevent the bridging of schoppage metal between adjacent laminates during application of the metal.

In one embodiment of the present invention, the ends 16a and 16b of the strip 16 which project laterally from opposite ends of the wound laminate L are utilized as handling tabs to support the wound laminate as it is subjected to a series of processing and assembly operations. For multi-function capacitors, the strip 16 is formed of metal or metallized plastic which is stiff enough and strong enough to support the weight of the laminate to which it is attached, and is insulated in the regions between the edges of the metal foil 14 and the ends of the laminate. For simple "X" or "Y" capacitors, non-conductive plastic strips may be utilized.

Figure 3:
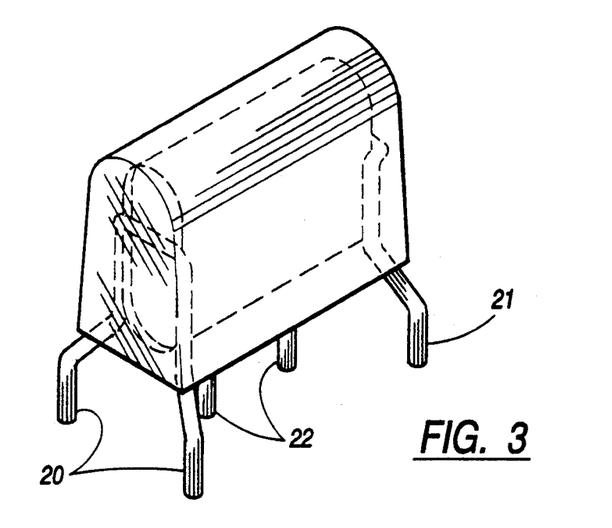
FIG. 3 is a perspective view of a multi-function capacitor produced from the wound laminates of FIGS. 1 and 2 using the process of the present invention.

The final product made from the illustrative laminate L is the integrated multi-function capacitor illustrated in FIG. 3, which has three pairs of leads 20, 21 and 22 extending downwardly from the lower surface thereof. The two pairs of leads 20 and 21 at opposite ends of the capacitor are welded to the schoopage metal on opposite ends of the wound laminate, and the middle pair of leads 22 are connected to the projecting ends 16a and 16b of the strip 16 which makes electrical contact with the intermediate electrode 14 of the capacitor.

Figure 5:
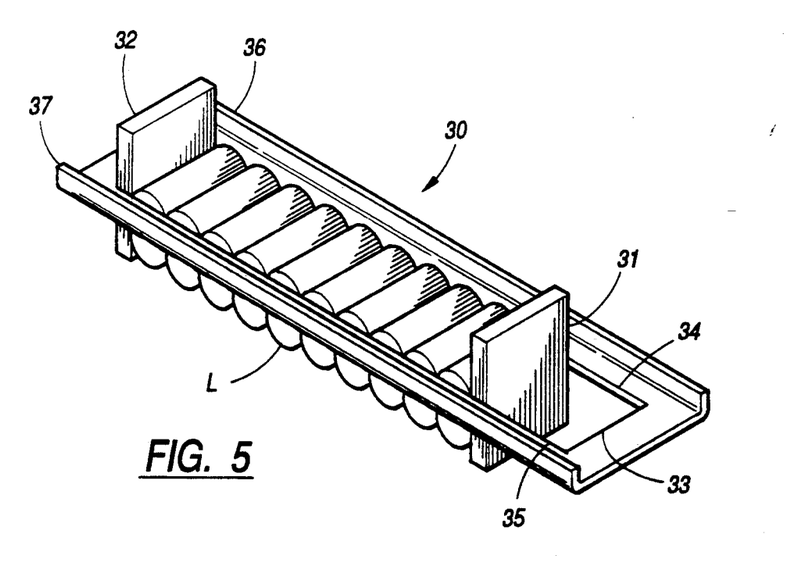
FIG. 5 is a perspective view, on a reduced scale, of a batch of flattened wound laminates formed by the device of FIG. 4.

In order to close the hole formed by the arbor on which the winding L of FIG. 1 is initially formed, and to minimize the voids within the wound laminate, it is flattened to convert the hollow circular cross section into a more solid, elliptical cross section. To effect the flattening, each circular laminate removed from the winding machine is loaded onto one end of a rack 30, between a pair of clamping plates 31 and 32. The rack 30 has an elongated rectangular opening 33 (FIG. 5) in the center of its bottom wall so that the longitudinal portions of the bottom wall on opposite sides of the opening form a pair of rails 34 and 35 for supporting the tabs 16a and 16b which extend from opposite ends of each laminate. The pair of upstanding sidewalls 36 and 37 along the longitudinal sides of the rack 30 in combination with the rails 34 and 35 form masks which protect the tabs 16a and 16b from the schoopage metal when it is sprayed onto the ends of the laminates, as described below.

Figure 4:
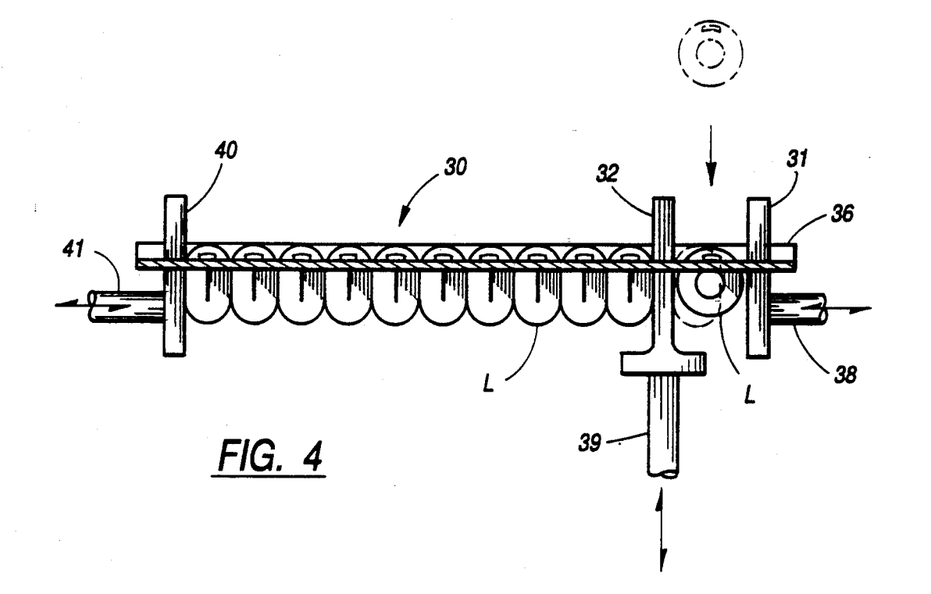
FIG. 4 is a side elevation of a device for sequentially flattening a series of wound laminates of the type illustrated in FIG. 1.

To flatten each new laminate that is loaded onto the right-hand end of the rack 30, as viewed in FIG. 4, the right-hand plate 31 is advanced toward the left-hand plate 32 by means of a force supplied by a rod 38 which is driven hydraulic or pneumatic cylinder, or an electric motor. The left-hand plate 32 remains stationary until the laminate has been flattened to the desired configuration, at which point the plate 31 is retracted slightly and then the left-hand plate 32 is retracted downwardly by a rod 39 to permit the flattened laminate to be advanced along the rails of the rack by advancing movement of the right-hand plate 31. A third plate 40 limits the advancing movement of the laminates along the rack, and is retracted by a rod 41 each time the plate 32 is lowered to permit a newly flattened laminate to be advanced by the plate 31. After the plate 32 has been raised again, a biasing force is applied to the plate 40 via the rod 41 to maintain the flattened laminates in the desired flattened shapes. When the rack 30 is filled with flattened laminates, the entire rack is removed from the flattening station by lifting the rack above the plate 32, and the rack carrying the flattened laminates is advanced to the next processing station.

Figure 6A:
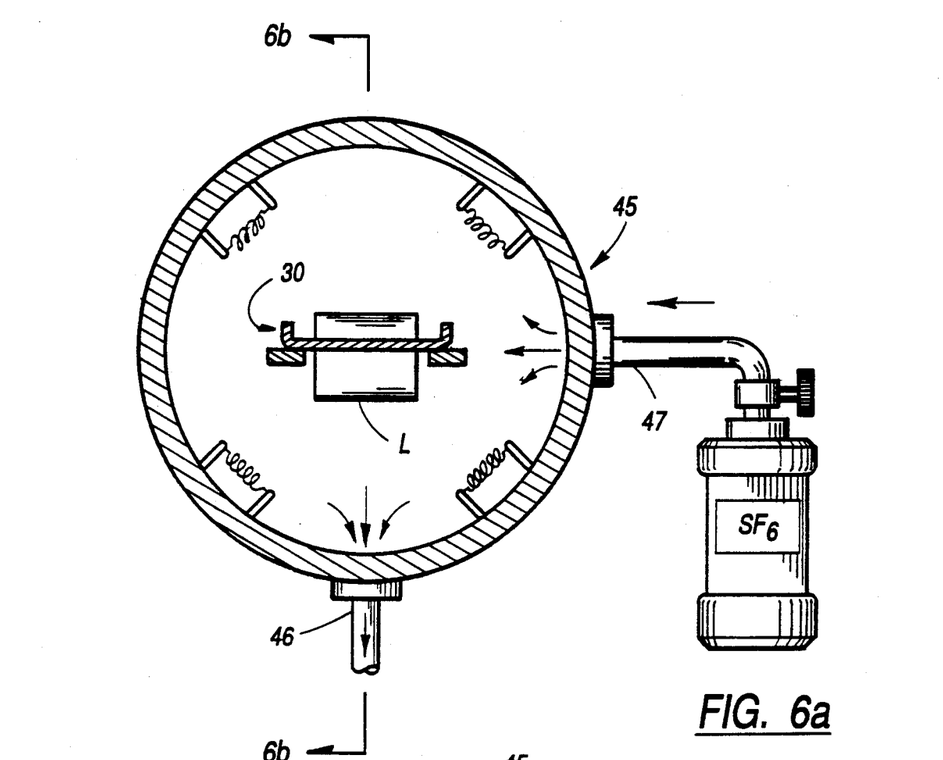
FIG. 6a is a sectional view of a device for evacuating and then impregnating and heating the batch of flattened laminates illustrated in FIG. 5.
Figure 6B:
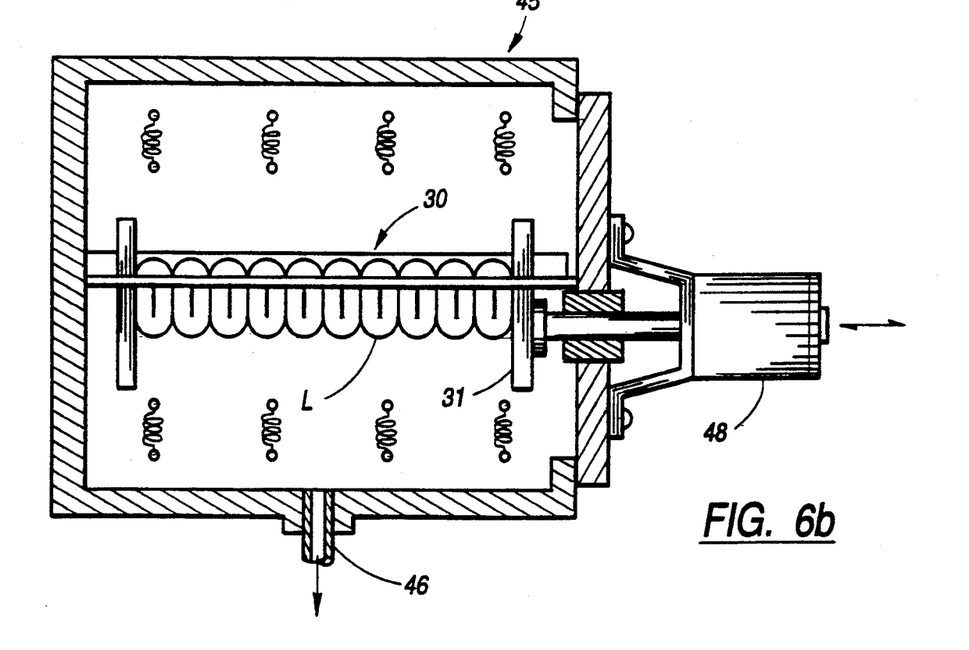

To prevent the laminates from popping out of the rack 30 during application of the flattening pressure, a cover 42 (FIG. 7) is placed over the laminates on each rack. In accordance with a further aspect of the present invention, the flattened wound laminates are placed in a closed chamber 45 (FIGS. 6a and 6b) which is first evacuated by drawing a vacuum through a port 46 in the bottom of the chamber. This negative pressure, which is preferably at least about 28 inches of mercury, removes air and moisture from the remaining voids in the wound laminate. Following such evacuation, the chamber 45 is filled through a side port 47 with a pressurized gas to fill the evacuated voids in the laminate with a gas which has a high ionizing voltage to reduce corona. Examples of suitable impregnating gases are sulfur hexafluoride and "Freon 12," which will penetrate into the interstices of a flattened wound laminate at pressures of about 2 to 6 psi. As illustrated in FIGS. 6a and 6b, an entire rack of flattened laminates may be disposed within the chamber 45 to permit the simultaneous processing of multiple laminates.

Following the gas impregnation step, the laminates are subjected to a predetermined temperature cycle, preferably while subjecting the laminates to additional flattening pressure by means of a pneumatic cylinder 48 having a rod 49 extending into the sealed chamber and acting on the plate 31 (FIG. 6b). This "cures" the laminate to a rigid, tightly wound elliptical shape in which the impregnating gas is locked into small voids by shrinkage of the multiple layers of the winding into tight engagement with each other. The heating also increases the gas pressure within the laminate, thereby ensuing that the gas penetrates all the internal voids. A typical temperature cycle increases the temperature of the laminates from ambient temperature to a temperature of at least about 95° C., preferably about 105° C., over a time period of about 30 minutes, while subjecting the laminates to a flattening pressure of about 5 pounds per square inch, depending upon the geometry of the laminate. After the desired maximum temperature is reached, the laminates are maintained at that temperature for about 30 minutes, and then gradually cooled to ambient temperature over a time period of about 30 minutes. If desired, the interior of the chamber 45 may be cooled more rapidly by providing cooling coils inside the chamber.

After the laminate L has been cured, schoopage metal is applied to opposite ends of the cured laminate to establish external electrical contact with the electrodes 13 and 15 at opposite ends of the laminate. This schoopage metal is applied by conventional metal-spraying equipment which directs a fine spray of metal mist onto the exposed end surfaces of the cured laminates. The application of the schoopage metal is normally effected in multiple passes so as to avoid an excessive increase in the temperature of the wound laminate due to the heat of the liquified metal.

In accordance with a further aspect of the present invention, the strips 17 and 18 of masking film or tape (FIG. 1) projecting slightly beyond both ends of the laminate L prevent the bridging of schoopage metal between adjacent laminates during the spraying operation. The bridging of such metal between adjacent capacitors makes it difficult or impossible to separate the capacitors, after the metal has solidified, without damaging the individual capacitors. In the particular embodiment illustrated, the cover film that is wound around the laminates in the winding machine extends about 0.020 inch beyond each end of the main body portion of the laminate, i.e., beyond the outer edges of the electrodes 13 and 15.

Figure 7:
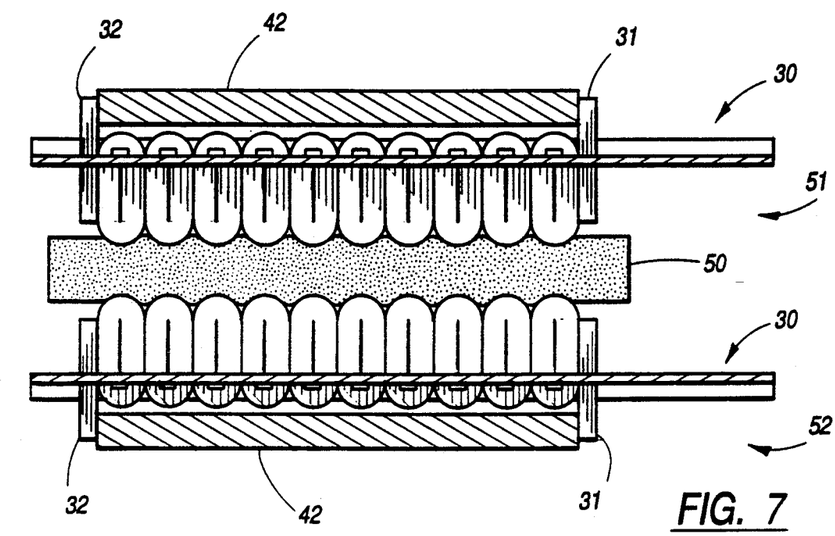
FIG. 7 is a side elevation illustrating a masking arrangement for two batches of flattened laminates of the type illustrated in FIG. 5, ready for the application of schoopage metal.
Figure 8:
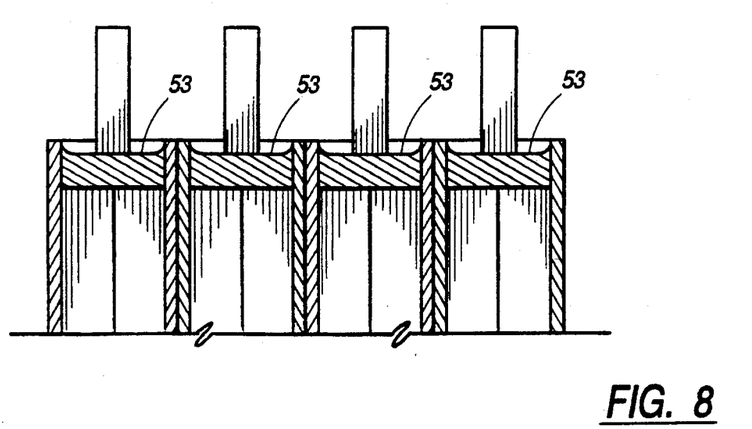
FIG. 8 is an enlarged fragmentary section of the end portions of four of the flattened laminates shown in FIG. 6, after the application of schoopage metal to the ends thereof.

FIG. 7 illustrates an arrangement which permits the simultaneous spraying of two racks of wound laminates L at the same time. In this arrangement a layer of crushable polymeric foam 50 is disposed between two racks of cured laminates 51 and 52, with the laminates on each rack being pressed into the crushable foam to form a tight mask which prevents the penetration of metal spray beyond the exposed end faces of the laminates. The covers 42 on both racks prevent the laminates from being pushed out of the racks by the foam 50. The resulting layer of solidified schoopage metal 53 on the ends of the wound laminates is illustrated in the enlarged cross-sectional view of FIG. 8.

Figure 9:
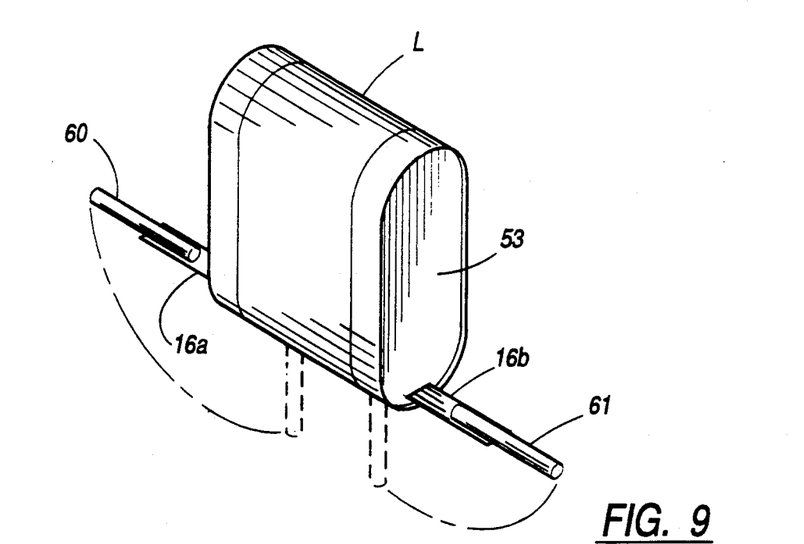
FIG. 9 is an enlarged perspective view of a flattened laminate for use in forming a multi-function capacitor and illustrating the method of forming leads from the tabs projecting from opposite ends of the laminate.

After the schoopage metal has solidified, the individual laminates are removed from the racks to permit the attachment of leads to the three electrodes 13, 14 and 15. First, metal leads 60 and 61 are welded to the ends of the two tabs 16a and 16b projecting beyond the schoopage metal on opposite ends of the laminate. The tabs 16a and 16b are then bent through 180 degrees, as illustrated in FIG. 9, so that they extend along the underside of the laminate, and the end portions containing the welded leads 60 and 61 are bent through an angle of 90 degrees in the reverse direction, so that the leads extend vertically downwardly from the central portion of the underside of the laminate. These become the two leads for making electrical connections to the intermediate electrode 14 of the multi-function capacitor.

To provide leads to the two end electrodes 13 and 15 which are in contact with the schoopage metal applied to opposite ends of the laminate L, a pair of generally U-shaped leads 20 and 21 are resistively welded to the respective layers of schoopage metal 53. The upper portion of each of these U-shaped leads 20 and 21 are bent to form a channel for receiving the main body portion of the laminate, with the transverse section 20a or 21a at the upper end of the lead element extending across a central portion of the schoopage metal 53 on one end of the laminate (see FIG. 3). It is these transverse sections 20a and 21a of the lead 20 and 21 that are then welded to the schoopage metal layer 53.

Figure 10:
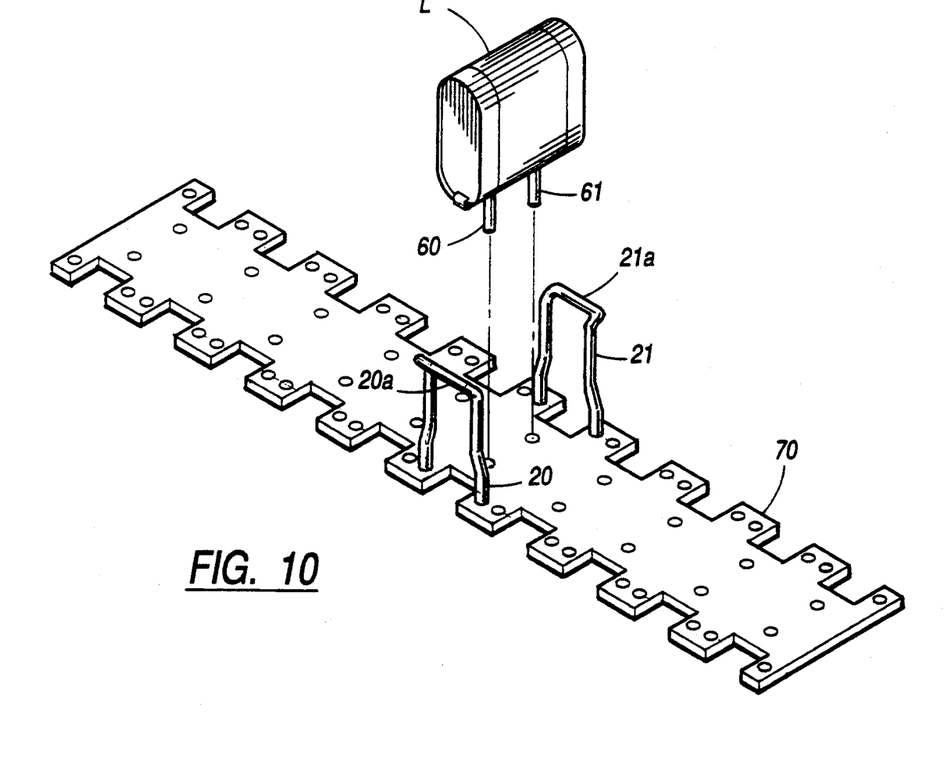
FIG. 10 is a perspective view of a device for applying two pairs of leads to the metal-coated ends of the laminate illustrated in FIG. 9.

To insure precise positioning of all the leads 20-22 while the end leads 20 and 21 are being fused to the ends of the laminate, the lower ends of the two U-shaped leads 20 and 21 are mounted in a fixture 70 which holds the two leads upright in precisely the desired positions while they are being welded to the schoopage metal on the ends of the laminate L. This fixture also includes a pair of holes for receiving the middle pair of leads 22 welded to the tabs 16a and 16b extending from opposite ends of the laminate. Thus, the fixture 70 maintains all the leads 20-22 in exactly the desired positions until all the weldments have been formed and the laminate and the portions of the leads attached thereto have been encapsulated. The encapsulation locks the leads permanently in the desired positions relative to each other. Consequently, when the capacitor is later mounted on a printed circuit board, having pre-formed holes for receiving the six leads of the capacitor, the leads will be in exact register with those pre-formed holes.

Figures 11, 12, 13:
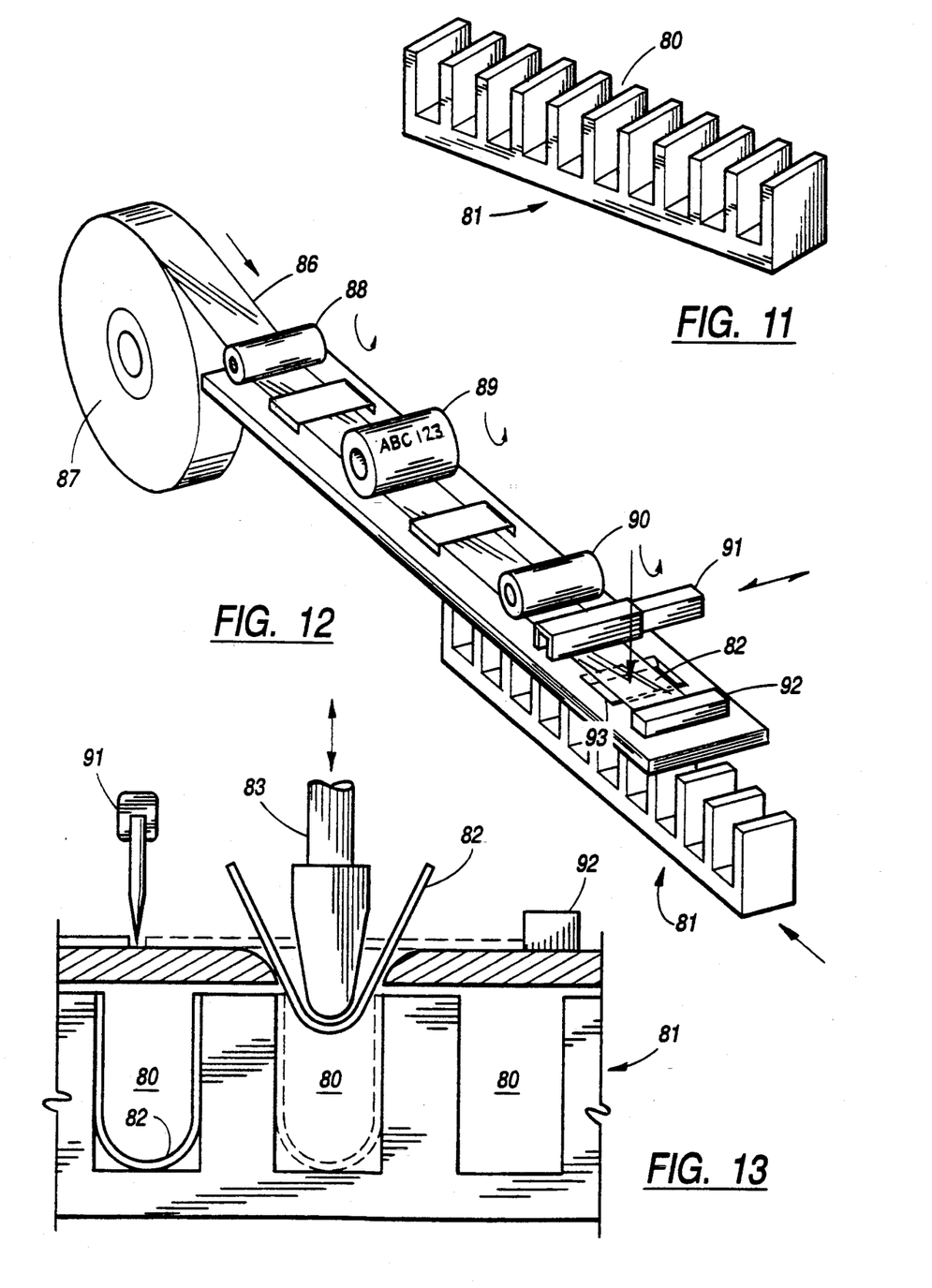
FIG. 11 is a perspective view of a molding frame for use in encapsulating the wound laminates after the leads have been attached thereto.
FIG. 12 is a diagrammatic illustration of a system for inserting strips of label film in the respective mold cavities of the molding framed illustrated in FIG. 11.
FIG. 13 is an enlarged side elevation illustrating the insertion of a strip of label film into one of the cavities in the molding frame in FIG. 12.
Figure 14:
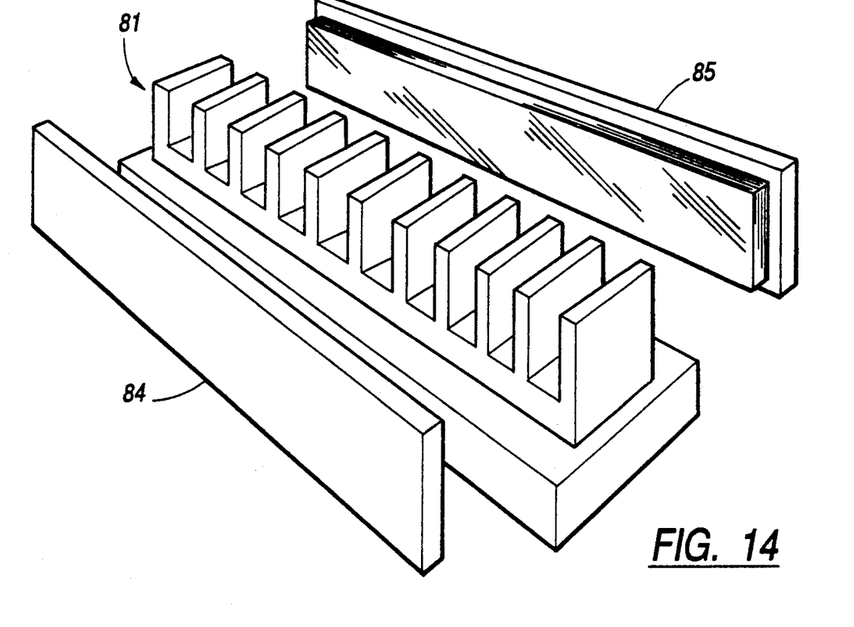
FIG. 14 is an exploded perspective of the molding frame of FIG. 11 and a cooperating pair of side plates which are used to close the open side portions of the mold cavities in that frame.

The next step in the fabrication process is the encapsulation or "potting" of the multi-function capacitors. For this purpose a plurality of cavities 80 in a molding frame 81 are lined with strips 82 of label film which can be pre-printed with the desired indicia for the individual capacitors. The pre-printed strips of label film are pressed down into each mold cavity 80 by a vertically moveable plunger 83, as illustrated in FIG. 13. The open ends of the mold cavities are then closed with a pair of moveable side plates 84 and 85 (FIG. 14) which are lined with a resilient material such as silicone rubber which does not adhere to the encapsulating resin.

FIG. 12 illustrates the processing steps involved in preparing the strips 82 of label film to be pressed into the various mold cavities 80. The label film is withdrawn as a continuous strip 86 from a reel 87, with the upper surface of the withdrawn strip being abraded by a roller 88 to facilitate bonding of the encapsulating resin to the label film. The strip then passes under a printing roll 89, which applies the desired indicia, and then on through a driven feed roll 90 which advances the free end of the film strip 86 beneath a moveable cutting blade 91. Each time the leading edge of the film strip engages a stop block 92, the feed roll 90 is stopped momentarily and the cutting blade 91 is advanced to cut off the desired length of film for depression into one of the mold cavities 80. The molding frame 81 is beneath an aperture 93 in the platform on which the film strip is prepared, so that the vertically moveable plunger 83 can press the severed film strips downwardly through the aperture 93 into successive mold cavities 80.

Figure 15:
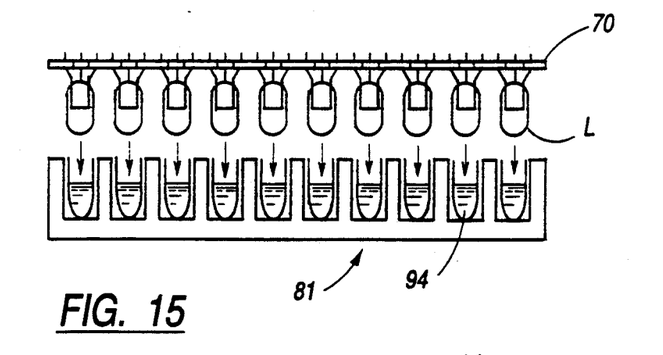
FIG. 15 is side elevation, on a reduced scale, of the molding frame having all the cavities therein lined with strips of label film and filled with encapsulating liquid, and with a rack of laminates disposed above the cavities ready for submersion therein.

After all the mold cavities have been lined with the strips of label film, the silicone-rubber surfaced side plates 84 and 85 are moved into engagement with the end walls of the mold cavities 80 so that each mold cavity is open only at the top. The mold cavities 80 are then partially filled with liquid encapsulating resin 94, after which a rack of capacitors are lowered into the liquid resin with the leads of the capacitors extending upwardly through a transport plate 70. The encapsulating resin typically has a low viscosity, so that it readily flows around the capacitors immersed therein and flows upwardly around the entire bodies of the capacitors and the adjacent portions of the multiple leads attached thereto. Of course, the upper portions of the leads extend above the encapsulating resin so that they are exposed for subsequent utilization in attachment of the capacitors to a printed circuit board or the like.

Figure 16:
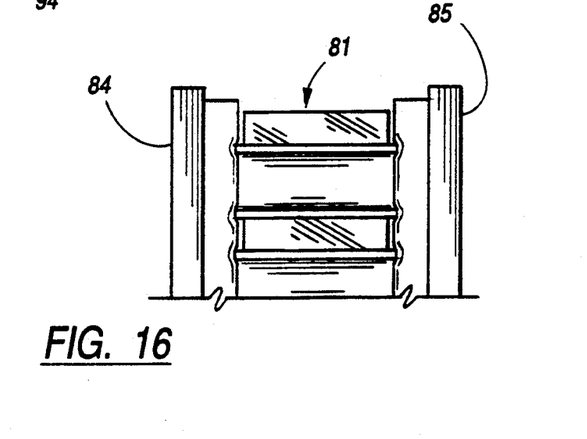
FIG. 16 is an enlarged top plan view of one of the cavities shown in FIG. 15.
Figure 17:
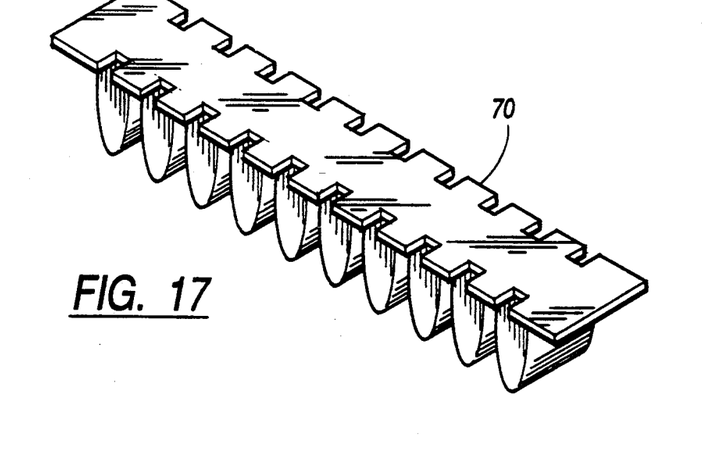
FIG. 17 is a perspective view of a rack of encapsulated capacitors after removal from the molding frame of FIGS. 14–16.

As can be seen in FIG. 16, the edges of the label film not only serve to shape the configuration of the encapsulating resin around each capacitor, but also help to seal the ends of the mold cavities when the silicone rubber-surfaced side plates are moved in against the ends of the U-shaped cavities. Specifically, the edges of the film strips 82 bite into the surfaces of the silicone pads, thereby forming an effective seal.

Placement of the printed indicia on the inside surface of the label film protects the indicia from solvents and cleaning operations, because the label film is sealed around its entire periphery. The use of a transparent or translucent film permits the indicia to be read through the film. Because the indicia do not have to withstand exterior conditions, relatively quick-drying and inexpensive marking methods and materials can be used.

Figure 18:
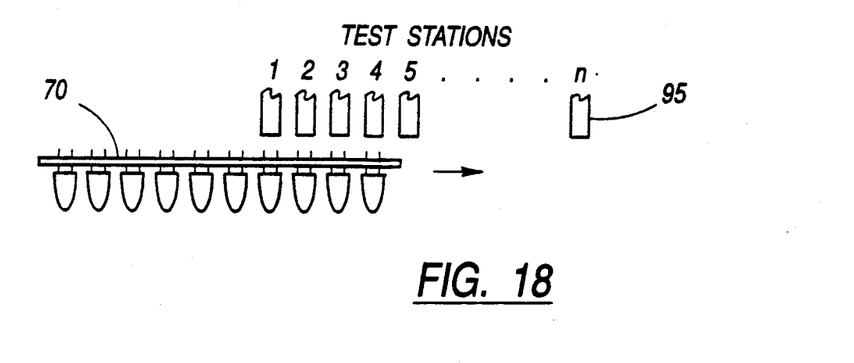
FIG. 18 is a diagrammatic illustration of the rack of capacitors illustrated in FIG. 17 being moved along a sequence of test stations.
Figure 19:
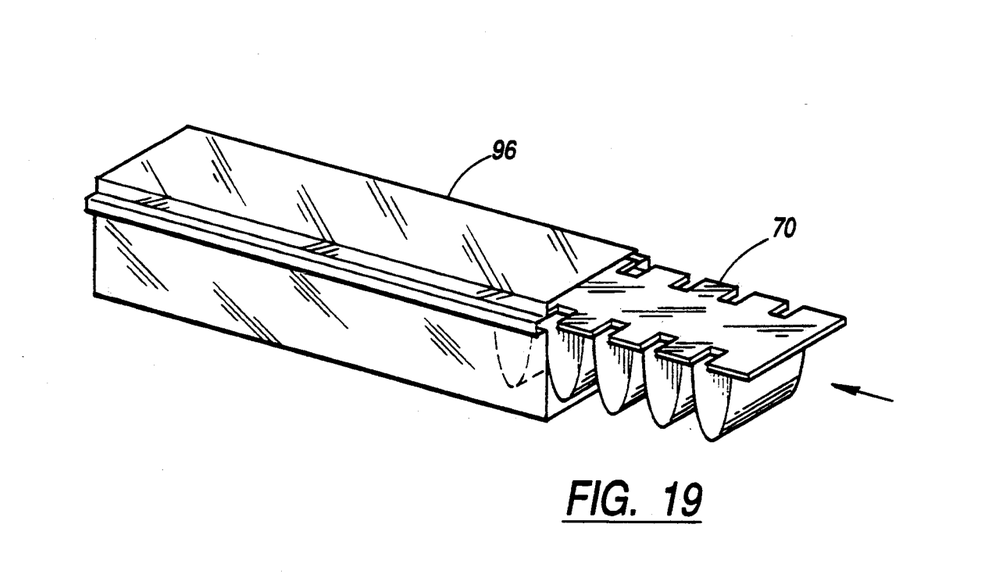
FIG. 19 is a perspective view of the rack of capacitors illustrated in FIG. 17 being inserted into a package.

Following the encapsulation of the capacitors, the capacitors can be transported via the same plate 70 which holds the leads of the capacitors as they are lowered into the encapsulating mold. Because the free ends of all six electrodes of each capacitor are exposed on the top surface of this transport plate 70, the plate can be indexed past a sequence of test stations 95 which make the desired contacts with the exposed leads to test each individual capacitor. The capacitors can then be shipped while mounted on this same plate, which can be slipped into mating grooves in a slide package 96, as illustrated in FIG. 19, to provide protective support for the capacitors during transport and storage.

Figure 20:
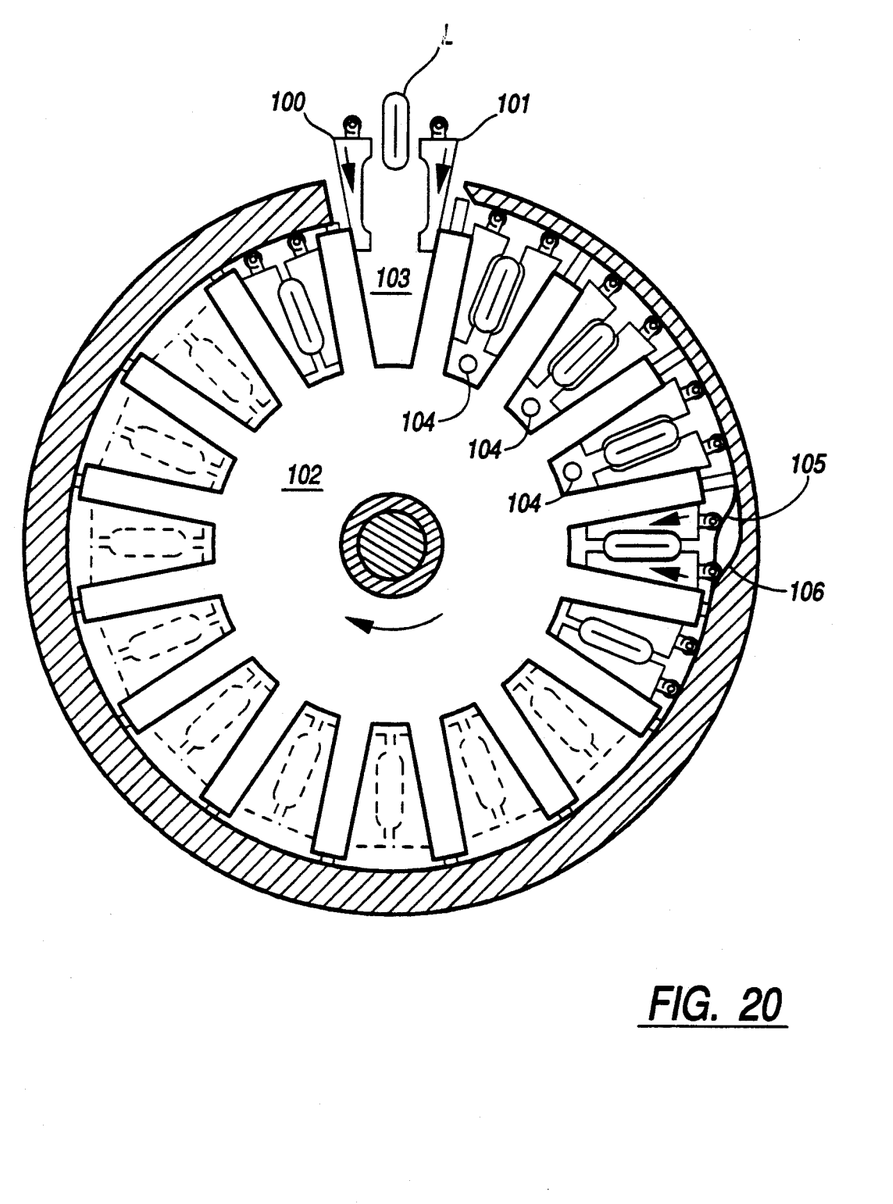
FIG. 20 is a side elevation of a carousel arrangement for carrying out the process steps of FIGS. 4–6 in an automated fashion.

FIG. 20 illustrates an automated carousel arrangement for carrying out the evacuation, impregnation, heat-curing, and final flattening operations which has been illustrated and described above in connection with FIGS. 4-6. Pre-flattened laminates L are fed into the carousel between a pair of open forming tools 100 and 101 at approximately the twelve o'clock position. Alternatively, windings may be fed into the open cavity of the carousel directly from the winding machine which winds the laminates. The opposed inside surfaces of the tools 100 and 101 are shaped to be complementary to the shape of the pre-flattened laminate L, and these tools are radially moveable in and out of V-shaped recesses spaced around the outer periphery of a driven rotary carrier 102. It will be noted that a multiplicity of such V-shaped cavities 103 are formed around the entire outer periphery of the carrier 102, and each such cavity is equipped with its own pair of radially moveable tools 100 and 101. The outboard end of each tool 100 and 101 carries a roller which serves as a cam follower riding on the inside surface of a cylindrical cam surrounding the outer periphery of the carrier 102.

The carrier 102 rotates in the clockwise direction as viewed in FIG. 20. From the twelve o'clock position to approximately the three o'clock position, the tools 100 and 101 capture the pre-flattened laminates therein, but do not exert any significant flattening pressure on those laminates. Within this range of travel of the carousel, the laminates are first evacuated, and then impregnated with a suitable gas. The evacuation and the impregnation are effected by gas flow through a series of ports 104 aligned with the inner ends of the V-shaped cavities 103 in the rotating carrier 102.

At approximately the three o'clock position of the rotating carrier, a pair of ramps 105 and 106 on the inside surface of the surrounding cam force the cam followers, and thus the tools 100 and 101 radially, inwardly along the walls of the V-shaped cavity 103. This radial inward movement of the tools forces the tools closer together, thereby exerting flattening forces on the sides of the laminate therein. This flattening force continues to be applied to the laminate throughout the duration of the rotational movement of the carousel, from the three o'clock position to the eleven o'clock position. During the interval when the flattening force is applied to the laminates within the various cavities, the laminates are first heated to a curing temperature, and then maintained at that temperature for the desired curing time. The time intervals of the heating and curing periods can be easily adjusted by controlling the rotational speed of the carousel. With the carousel arrangement, the heating and curing times can be substantially reduced, thereby increasing the capacitor production rates, because the capacitors can be much more rapidly heated and cooled via the thermally conductive tools 100 and 101 which encompass the major portion of the surface area of each capacitor. This allows much faster heating and cooling than is possible when the capacitors are cured in racks where the capacitors tend to have an insulating effect when they are pressed against each other within the rack. The tall, thin configuration of the wound laminate also facilitates rapid heating and cooling of the laminates.

The carousel arrangement of FIG. 20 also is readily adaptable to the processing of different models of capacitors, simply by changing the tools 100 and 101 to accommodate different sizes and shapes of laminates. The inside surfaces of the tools are also preferably made of a somewhat resilient material to accommodate slight variations in the dimensions of the laminates.

Figure 21:
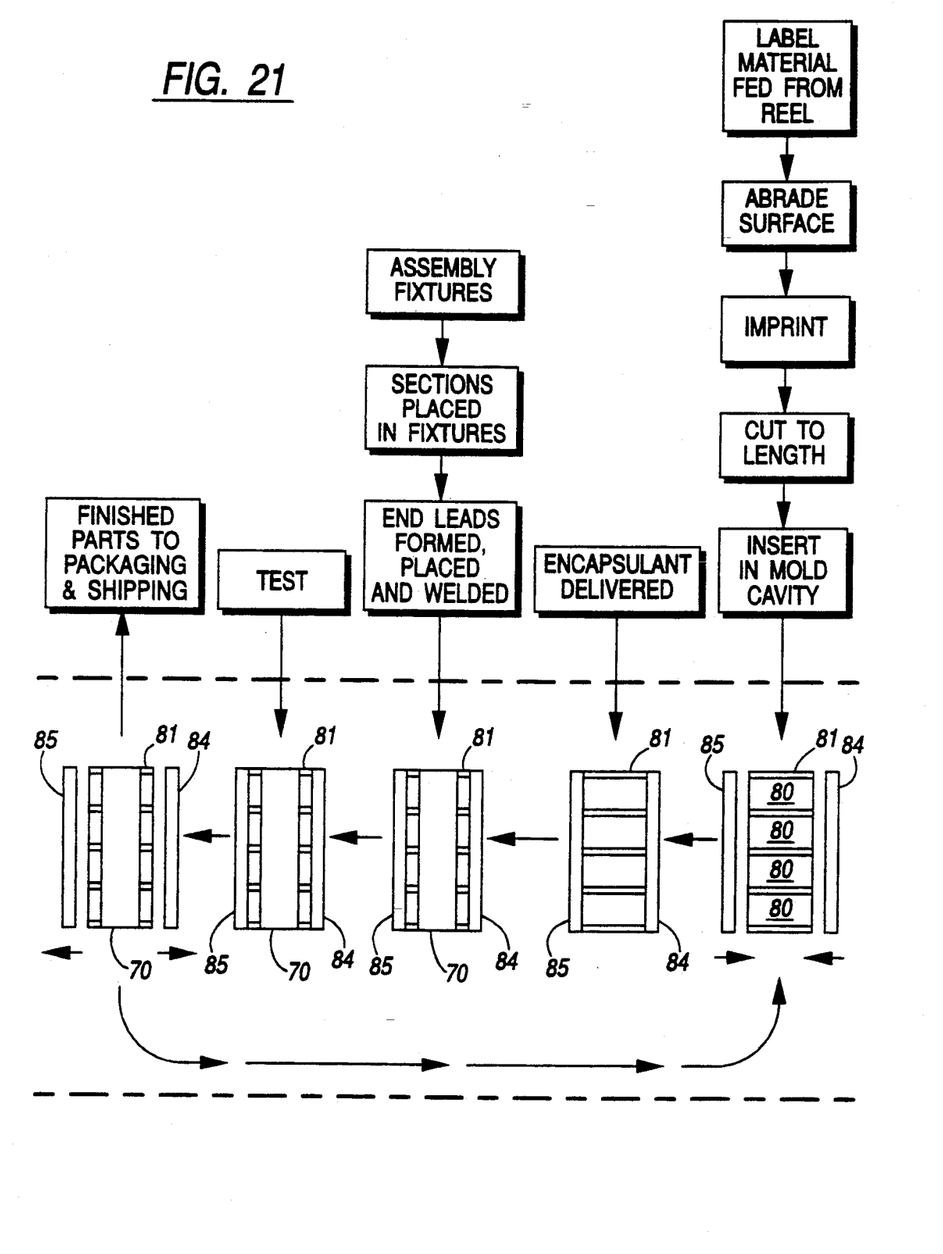
FIG. 21 is a diagrammetic illustration of a second carousel arrangement for completing the fabrication of capacitors initiated in the carousel of FIG. 20.

To complete the fabrication of capacitors from the cured laminates discharged from the carousel of FIG. 20, those cured laminates may be processed in a second carousel which carries out the operations illustrated in FIG. 21. This second carousel would carry a plurality of molding frames 81 of the type illustrated in FIG. 11, with built-in side plates 84 and 85 of the type illustrated in FIG. 14. During rotational movement of the carousel, the side plates 84 and 85 would be moved into and out of engagement with the ends of the molding frame 81, as illustrated in FIG. 21. The operations carried out above the molding frame, i.e., above the open tops of the mold cavities, are illustrated by the flow charts in the upper portion of FIG. 21. Thus, at a first processing station the strips 82 of label material are prepared in the same manner illustrated in FIG. 12 and inserted into the various mold cavities 80. The side plates 84 and 85 are then advanced into engagement with the ends of the mold cavities 80, and the liquid encapsulant is delivered into the mold cavities at a second carousel station. At a third station, a rack of laminates which already have the schoopage metal and leads attached thereto is moved over the molding frame and lowered into the mold cavities, in the same manner illustrated in FIG. 15. The encapsulating polymer can be allowed to cure as the mold cavities continue to be rotated. Finally, the carousel passes beneath a test station where the upwardly projecting leads of the encapsulated capacitors are automatically brought into contact with the desired test equipment, after which the side plates 84 and 85 are retracted from the molding frame 81, and the entire rack of encapsulated capacitors is lifted out of molding frame and packaged for shipment.

While the invention has been described above with reference to certain preferred embodiments, it will be understood that a number of modifications can be made without departing from the spirit and scope of the invention. For example, when the process is used to make "X" capacitors only, a single strip of masking film may be used in place of the two separate strips 17 and 18 described above.

I claim:

1. A method of fabricating an electrical capacitor from a wound laminate of conductive and non-conductive materials, said method comprising the steps of
enclosing the wound laminate in a sealed chamber,
drawing a vacuum on said chamber to evacuate any voids in the wound laminate, and then filling said chamber with a pressurized impregnating gas to fill the evacuated voids in the wound laminate,
heating the laminate to a curing temperature,
applying schoopage metal to opposite ends of the cured laminate,
attaching a pair of electrical leads to the schoopage metal on opposite ends of the cured laminate, and
encapsulating the cured laminate in a molded polymer.

2. The method of claim 1 which includes the step of compressing the wound laminate in said chamber in a direction transverse to the axis thereof to press the multiple layers of the winding tightly together prior to or during said heating step.

3. The method of claim 2 wherein said laminate has an elongated transverse cross section, and the laminate is compressed in a direction perpendicular to its elongated transverse axis.

4. The method of claim 2 wherein said laminate is compressed at a pressure of at least about 5 pounds per square inch.

5. The method of claim 1 wherein said wound laminate includes a pair of integrated tabs projecting axially from opposite ends thereof, and said laminate is supported by said tabs during the evacuation, impregnation, compression and curing thereof.

6. The method of claim 1 wherein at least the non-conductive material in said wound laminate is thermally shrinkable so that said heating step shrinks the windings of the laminate tightly.

7. The method of claim 1 wherein said vacuum drawn on said chamber is a negative pressure of at least about 28 inches of water.

8. The method of claim 1 wherein said impregnating gas is sulfur hexafluoride or "Freon 12" at a pressure above the ambient pressure.

9. The method of claim 1 wherein the non-conductive material in said laminate is a polymeric capacitor film, and said curing temperature is at least about 95° C.

10. The method of claim 9 wherein said laminate is maintained at said curing temperature for at least about 2 minutes.

11. The method of claim 1 wherein said schoopage metal is applied by spraying, and said laminate includes a cover film wound around at least the edge portions of the laminate and projecting beyond opposite ends of the laminate to prevent the bridging of schoopage metal between adjacent laminates, and multiple laminates are arranged side-by-side during the application of said schoopage metal.

12. The method of claim 1 wherein the free ends of said electrical leads are supported in a fixture which holds the leads in predetermined positions during the attachment of said leads to the opposite ends of the laminate and during said encapsulating step.

13. The method of claim 1 wherein said encapsulating step comprises placing the cured laminate in a cavity that has a bottom wall and a pair of opposed side walls lined with a film of label material that adheres to the encapsulating polymer, and a pair of opposed end plates having resilient surfaces which do not adhere to the encapsulating polymer.

14. The method of claim 13 wherein said film of label material is preprinted on the inside surface thereof.

15. The method of claim 13 wherein the inside surfaces of said opposed end plates are made of silicone rubber.

16. A method of encapsulating an electronic component comprising the steps of
providing a U-shaped cavity,
lining the U-shaped cavity with a strip of polymeric film which projects slightly beyond the ends of said cavity,
closing the ends of said cavity with plates having resilient surfaces which engage the projecting edges of said film,
placing a predetermined amount of liquid encapsulating resin in the lined cavity,
immersing the electronic component in the liquid resin within the lined cavity with the leads of the component projecting upwardly above the lined cavity,
solidifying the liquid resin around the immersed electronic component so that the resin bonds to the body of the component, the portions of the leads directly adjacent the component body, and the lining film, and withdrawing the side plates from the ends of said cavity and removing the encapsulated component from said cavity.

17. The method of claim 16 wherein said strip of polymeric film is printed on its inside surface with identifying indicia for the electronic component before said strip is placed in said cavity.

18. The method of claim 16 wherein said resilient surfaces on said end plates are made of silicone rubber.

19. A method of fabricating wound electrical capacitors each of which comprises a wound laminate of conductive and non-conductive materials, said method comprising the steps of wrapping at least the edge portions of the wound laminate, at both ends thereof, with a film which extends continuously around the entire periphery of the end face of the laminate and projects beyond the ends of the main body portion of the laminate, arranging multiple wound laminates side-by-side so that the projecting portions of said film on adjacent laminates are parallel and contiguous, applying schoopage metal to the exposed ends of the multiple laminates so that the projecting portions of the said film prevent the bridging of schoopage metal between adjacent laminates, and attaching a pair of electrical leads to the schoopage metal on opposite ends of each laminate, while said film remains on the wound laminate to become a permanent part of the capacitor.

* * * * *